US006727919B1

(12) United States Patent
Reder et al.

(10) Patent No.: US 6,727,919 B1
(45) Date of Patent: Apr. 27, 2004

(54) FLEXIBLE MOUSE-DRIVEN METHOD OF USER INTERFACE

(75) Inventors: Paul Joseph Reder, Durham, NC (US); Carole Ameila McCallum, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 773 days.

(21) Appl. No.: 09/111,495

(22) Filed: Jul. 7, 1998

(51) Int. Cl.[7] ............................................... G06F 15/00
(52) U.S. Cl. ...................................... 345/810; 345/841
(58) Field of Search ................................ 345/333, 334, 345/335, 339, 346, 347, 352, 353, 354, 762, 763, 764, 765, 804, 808, 810, 841, 840

(56) References Cited

U.S. PATENT DOCUMENTS

| | | | |
|---|---|---|---|
| 5,179,700 A | 1/1993 | Aihara et al. | 395/650 |
| 5,186,629 A | 2/1993 | Rohen | 434/114 |
| 5,345,380 A | 9/1994 | Babson, III et al. | 364/400 |
| 5,384,910 A | 1/1995 | Torres | 395/156 |
| 5,420,976 A | 5/1995 | Schell et al. | 395/159 |
| 5,450,538 A | 9/1995 | Glaser et al. | 395/149 |
| 5,588,105 A | 12/1996 | Foster et al. | 395/326 |
| 5,598,522 A | 1/1997 | Inatomi | 395/352 |
| 5,657,246 A | 8/1997 | Hogan et al. | 348/515 |
| 5,659,693 A | 8/1997 | Hansen et al. | 395/333 |
| 5,675,752 A | 10/1997 | Scott et al. | 395/333 |
| 5,751,287 A * | 5/1998 | Hahn et al. | 345/351 |
| 5,760,768 A * | 6/1998 | Gram | 345/333 |
| 5,828,376 A * | 10/1998 | Solimene et al. | 345/352 |

FOREIGN PATENT DOCUMENTS

| | | | | |
|---|---|---|---|---|
| JP | 07110763 | 4/1995 | | G06F/9/06 |
| WO | WO9721171 | 6/1997 | | G06F/9/44 |

OTHER PUBLICATIONS

TDB Vol 39 No. 7 Jul. 1996, "Mouse–Based Interface Providing Keyboard Functions".
TDB Vol 38 No 10 Oct. 1995, "Mechanism for Scripting Tutorials for an Interactive Help Sprite Agent".
TDB Vol 38 No 5 May 1995, "New Elements for a Graphical Interface".
"Ghost–House: a class library for generating customizable graphical user interfaces." *Transactions of the Information Processing Society of Japan*, vol. 36, No. 4, pp. 944–958, Apr., 1995, Kitamura M., et al. (abstract only).
"An automatic and visual approach for user interface design." *Engineering for Human–computer Interaction*. Proceedings of the IFIP TC 2/WG 2.7 Working Conference, Napa Valley, CA, USA Aug. 21–25, 1989, Petoud, I., et al. (abstract only).

* cited by examiner

*Primary Examiner*—Cao (Kevin) Nguyen
(74) *Attorney, Agent, or Firm*—Gerald R. Woods

(57) ABSTRACT

A method of customizing a graphical user interface (GUI) having one or more command structures (such as toolbars, pull-down menus, or status bars), by dynamically modifying the command structure in response to direct manipulation of the command structure using a graphical pointer of the GUI controlled by a pointing device (e.g., mouse). The structures may be modified using a direct manipulation "drag-and-drop" procedure. A command item can be dragged from a first location within a command structure to a second location within the same command structure, simply moving the position of the item within that structure. The command item can also be dragged from a first location within a command structure to a second location outside of the command structure, such as to a trash bin provided by the GUI (for deletion of the item), or to a second command structure (for moving or copying the item, e.g., from a toolbar to a pull-down menu). Customized interfaces can be saved and maintained with password protection, allowing a system administrator to lock an interface.

23 Claims, 6 Drawing Sheets

FLEXIBLE MOUSE-DRIVEN METHOD OF USER INTERFACE

BACKGROUND OF THE INVENTION

1. Field of the Invention

The present invention generally relates to computer systems, and more particularly to a graphical user interface (GUI) for a computer system which provides mouse-driven, dynamic customization of features of the interface such as pull-down menus, status bars, toolbars, and command items.

2. Description of Related Art

Figure 1:
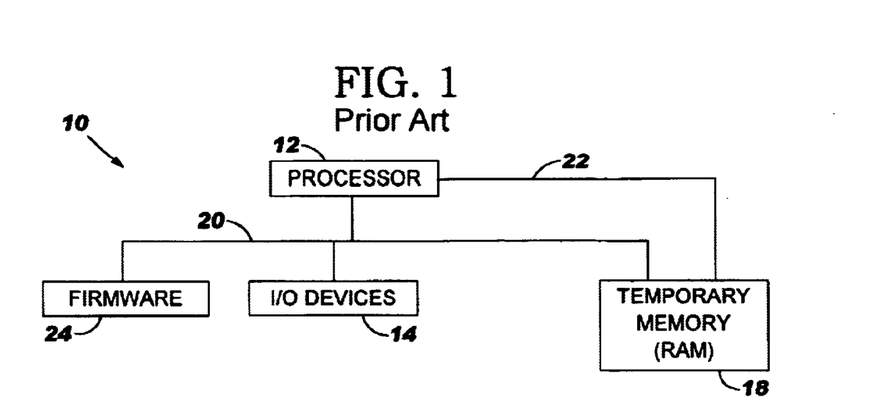
FIG. 1 is a block diagram of a conventional computer system.

The basic structure of a conventional computer system 10 is shown in FIG. 1. Computer system 10 has at least one central processing unit (CPU) or processor 12 which is connected to several peripheral devices, including input/output devices 14 (such as a display monitor, keyboard, and graphical pointing device for the user interface, and a permanent memory device such as a hard disk for storing the computer's operating system and user programs), and a temporary memory device 18 (such as random access memory or RAM) that is used by processor 12 to carry out program instructions. Processor 12 communicates with the peripheral devices by various means, including a bus 20 or a direct channel 22. Computer system 10 may have many additional components which are not shown, such as serial and parallel ports for connection to, e.g., modems or printers. Those skilled in the art will further appreciate that there are other components that might be used in conjunction with those shown in the block diagram of FIG. 1; for example, a display adapter connected to processor 12 might be used to control a video display monitor, and a memory controller may be used as an interface between temporary memory device 18 and processor 12. Computer system 10 also includes firmware 24 whose primary purpose is to seek out and load an operating system from one of the peripherals (usually the permanent memory device) whenever the computer is first turned on.

Figure 2:
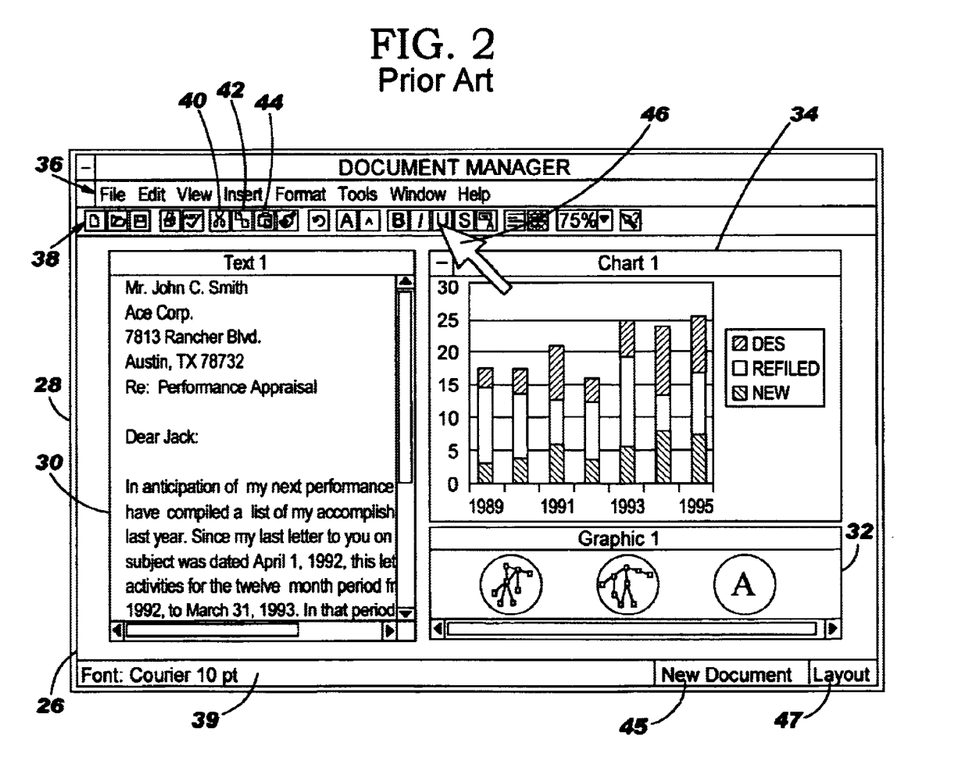
FIG. 2 is an illustration of a computer display showing a conventional graphical user interface (GUI) which employs a menu bar, a toolbar, and a status bar to allow simplified execution of program commands.

With further reference to FIG. 2, conventional computer systems often employ a graphical user interface (GUI) to present information to the user. In the example of FIG. 2, a generic application program entitled "Document Manager" is presented by the GUI as a primary application window (parent window) 26 on a display device 28 (i.e., video monitor). In this example, the application window has several secondary, enclosed windows (child windows) 30, 32 and 34 which depict the contents of various files that are handled by the program. A menu bar 36 with a standard set of commands, a toolbar 38, and a status bar 39 may also be provided as part of the GUI, to simplify manipulation and control of the objects (e.g., text, charts and graphics) within the child windows.

Toolbars can be provided as rows or columns, and have several buttons comprising textual icons, non-textual (graphic) icons, or icons having both graphic and textual elements. The depicted toolbar 38 includes, for example, three common edit-type buttons 40, 42 and 44 used respectively to "cut," "copy" and "paste" file objects.

Each of these buttons can be easily activated using the graphical pointer 46 controlled by a pointing device (e.g., mouse) connected to the computer which is manually actuated.

Status bar 39 includes a message field providing an indication of, e.g., the current program state, or object attributes (such as the current font to be used for textual objects). The message changes as various objects or commands are selected. Sometimes programmers find it useful to include additional action objects, or buttons, on the status bar. Since status messages are typically less than the full length of the bar, these additional buttons take up otherwise unused space. Two buttons 45 and 47 are shown with status bar 39.

Figure 3:
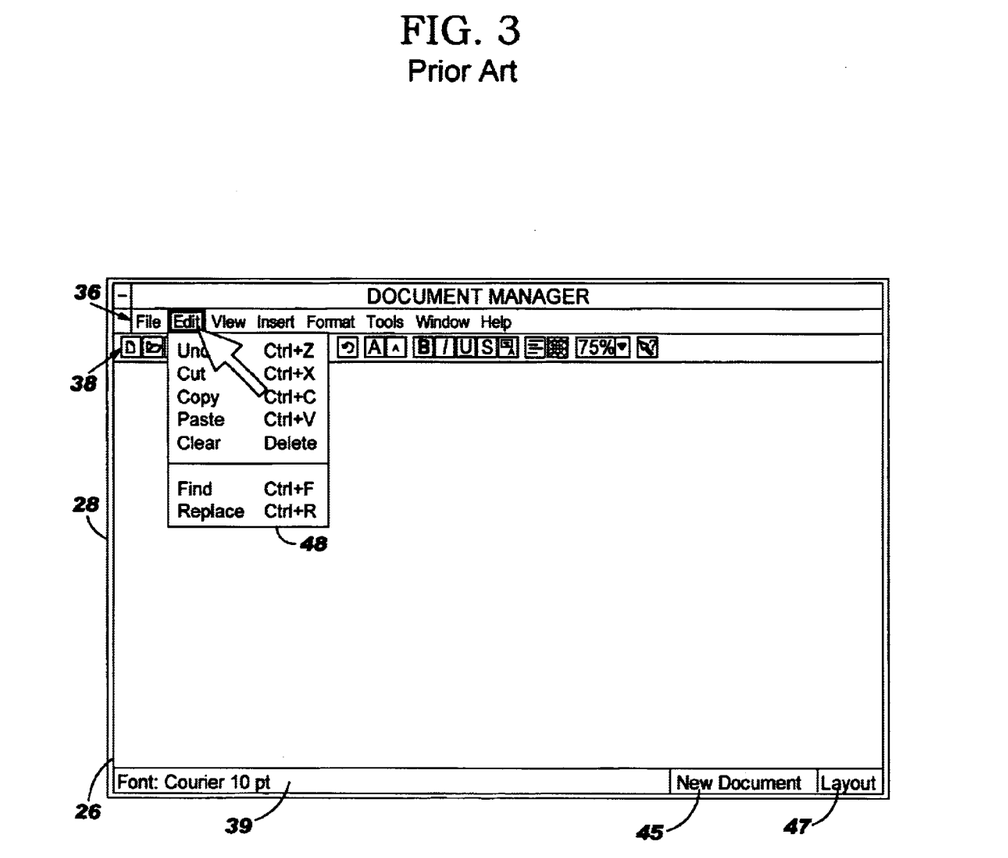
FIG. 3 is an illustration of the GUI of FIG. 2 wherein a menu bar command has been selected, resulting in the display of a pull-down menu, and a change in a status message.

As further seen in FIG. 3, when a given word on the menu command line 36 is activated, the GUI displays a pull-down menu, such as pull-down menu 48. A pull-down menu has several lines, and a given line can provide a single command or provide a link to a further pull-down menu. A pull-down menu can offer even more helpful information by indicating, on the corresponding lines, special keystrokes or keystroke combinations that can be used to activate the pull-down commands even when the pull-down menu is not being displayed. FIG. 3 also illustrates how the message on status bar 39 changes when the "Edit" command is selected, to read 37 Change this document (undo, undelete, cut, copy, paste, . . . )". The pull-down menu items, toolbar icons, and status bar buttons are generally referred to herein as "command items."

In graphical applications it is very common for there to be a one-to-one mapping between individual menu bar pull-downs and toolbar items. For instance, if the user selects the "Edit" feature on command line 36 (using either the pointing device or the keyboard), pull-down menu 48 is displayed, and includes pulldowns "Undo," "Cut," "Copy," "Paste," "Clear," "Find," and "Replace" (the underlined letters in these words correspond to the keystrokes on the keyboard which can be used to select the pulldowns while the pull-down menu is displayed). Of these seven pull-down items, three of them thus correspond to toolbar items;

namely, the second, third and fourth lines respectively correspond to buttons 40, 42 and 44. The other four lines on pull-down menu 48 have no corresponding buttons in the depicted toolbar 38, although many application programs allow the user to customize toolbars (e.g., add buttons for other pulldowns).

Pull-down menus, toolbars and status bars (generally referred to herein as "command structures") offer a mechanism for executing special program commands. However, in today's complicated applications, there are often functions presented via the user interface which are not regularly used, taking up display area, and possibly confusing the end user. There are also valuable functions which are not easily accessible. Present GUIs do not present an easy or intuitive way to allow end users (or system administrators) to tailor the user interface so that it makes sense and is more efficient for them.

Although many applications allow some level of customization of the interface, this functionality is limited. For example, alternate pull-down menus may be provided with short versus long menus, or advanced versus novice menus, but the alternate menus are restricted to certain preselected commands. Status bars can similarly allow the presence or absence of only certain preselected items, with no positional control. Toolbars can be modified to include different items, and allow some positional control, but the current methods involve displaying a separate window wherein the user can select items from an "available item" list box and add them to a "displayed items" list box, or use check-boxes to select the items desired for the toolbar. Once the user is done, an "OK" button in this window is selected, and the application GUI (toolbar, menu, or status bar) is then updated with the new item(s). This form of user control is indirect and the visual feedback is delayed. There is also very limited function capability provided to allow an administrator to create and maintain a customized, user interface layout. The few applications that provide for some level of administrator customization provide it through macro language programming, rather than direct manipulation.

In light of the foregoing, it would be desirable to devise an improved method of dynamically customizing menus, status areas, or tool bars of an application. It would be further advantageous if the method were to allow an administrator to create different customized versions of a product tailored to different users, and then preserve these altered user interfaces. For example, a systems administrator could create different interfaces for users with different security privileges or different skill levels.

SUMMARY OF THE INVENTION

It is therefore one object of the present invention to provide an improved graphical user interface (GUI) having command structures such as pull-down menus, toolbars and status bars.

It is another object of the present invention to provide such a GUI which allows the simple and intuitive customization of such command structures.

It is yet another object of the present invention to provide such a GUI which allows a system administrator to create and safeguard different customized versions of the command structures for different users.

The foregoing objects are achieved in a computer system generally comprising a display device, a pointing device (mouse), and program instructions for generating a graphical user interface (GUI) on the display device. The GUI includes a window having a command structure, and further including a graphical pointer controlled by the pointing device, wherein the program dynamically modifies the command structure in response to direct manipulation of the command structure using the graphical pointer. The command structure may be, e.g., a toolbar, a pull-down menu, or a status bar. These structures may be modified using a direct manipulation "drag-and-drop" procedure familiar to mouse users. The command item can be dragged from a first location within the command structure to a second location within the same command structure, simply moving the position of the item within that structure. The command item can also be dragged from a first location within the command structure to a second location outside of the command structure, such as to a trash bin provided by the GUI (for deletion of the item), or to a second command structure (for moving or copying the item, e.g., from a toolbar to a pull-down menu). In the latter case, a pop-up window may be generated by the GUI to allow a user to select a modification operation to apply to the command item (i.e., the "Move" operation versus the "Copy" operation).

The customized version of the GUI which is created by modification of the toolbars, status bars, or pull-down menus can be saved, and can be further maintained with password protection, allowing a system administrator to lock the GUI in order to provide more reliable support for various user groups. The new GUI structure remains in effect until it is changed or reset to the application's original default settings.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENTS

The present invention is directed to a computer system having a graphical user interface (GUI) providing at least two command structures, such as a pull-down menu, a toolbar, or a status bar. The computer system's hardware may include the various components shown in FIG. 1, but the computer system is not necessarily conventional, i.e., it could include new hardware components as well, or have a novel interconnection architecture for existing components. Therefore, while the present invention may be understood with reference to FIG. 1, this reference should not be construed in a limiting sense. The GUI of the present invention may further be adapted for use with existing operating systems such as OS/2 (a trademark of International Business Machines Corp.) or Windows 98 (a trademark of Microsoft Corp.). Users of these systems are accustomed to interfacing with status bars, toolbars, and items selectable from menu bar pulldowns.

Figure 4A:
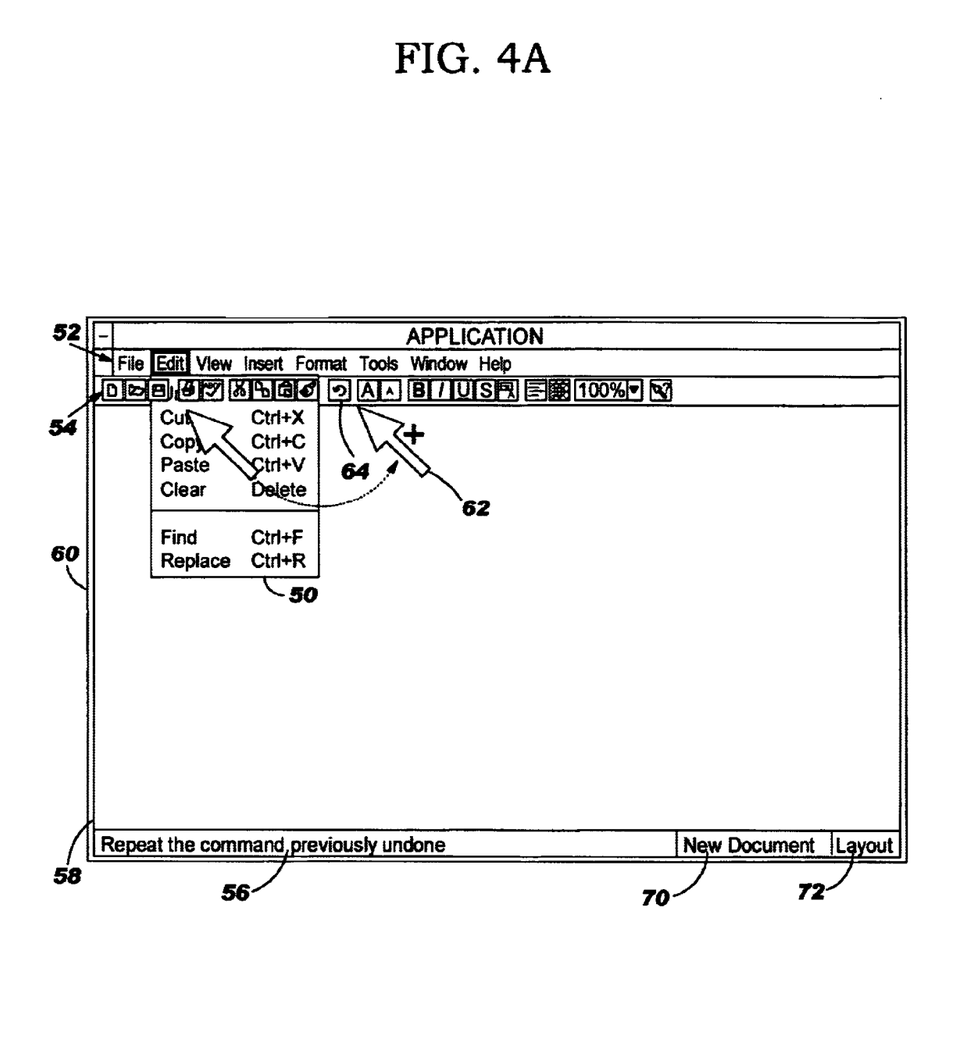
FIG. 4A is an illustration of a computer display showing a GUI designed in accordance with the present invention to provide a mouse-driven method of customizing command structures, wherein a pull-down menu item is being dragged onto a toolbar, specifically, in this example, the "Redo" command.
Figure 4B:
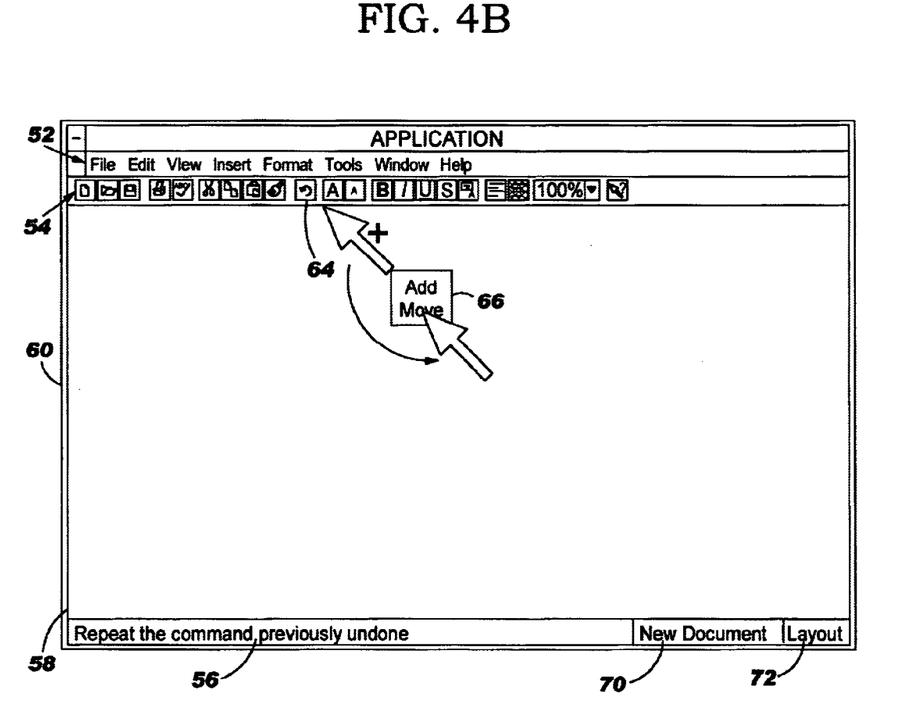
FIG. 4B is an illustration the GUI of FIG. 4A wherein a pop-up menu appears in response to the drag-and-drop operation of FIG. 4A.
Figure 4C:
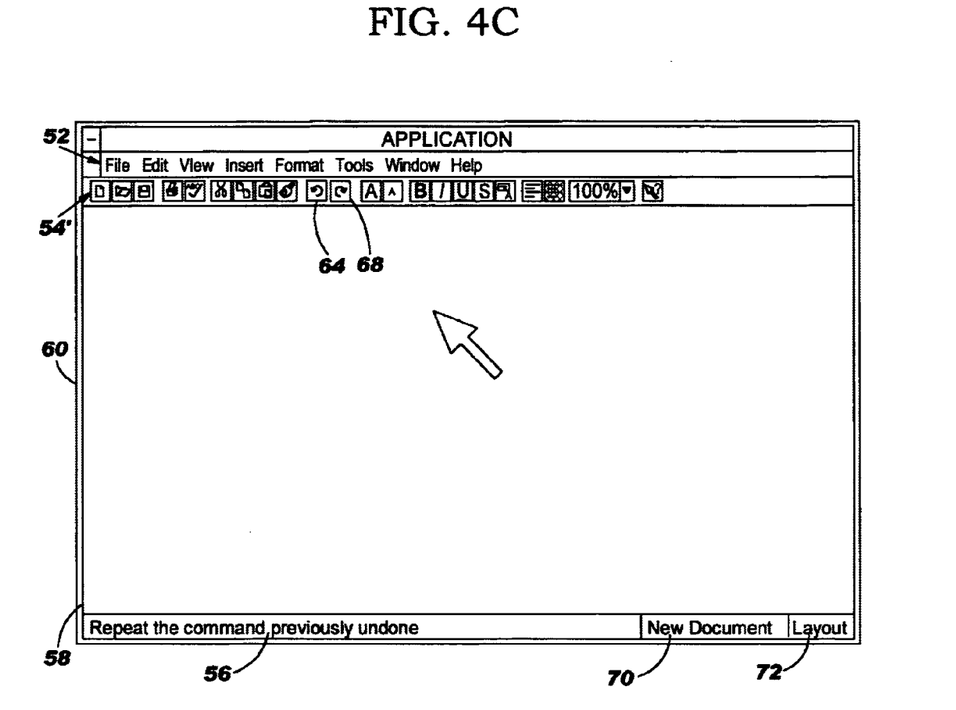
FIG. 4C is an illustration of the GUI of FIGS. 4A and 4B wherein the toolbar has been modified to include the item dragged from the pull-down menu 68.

With reference now to FIGS. 4A–4C, the present invention introduces the concept of dynamically customizing GUI command structures provided by an application, via direct manipulation (during runtime) of the command structures (i.e., the change is committed to the system immediately). The structures may be modified using variations of the standard drag-and-drop protocols that are already familiar to users. According to these protocols, the user selects an item from a first one of the command structures by placing the graphical pointer over the item, and then depressing a button or some set of buttons on the pointing device (e.g., mouse). While the button is still depressed, the graphical pointer is moved from the first command structure to a second command structure.

FIG. 4A depicts the dragging of the "Redo" command from a pull-down menu 50 (which hangs below a menu bar 52) to a toolbar 54. Pull-down menu 50, menu bar 52 and toolbar 54, as well as a status bar 56, are part of the application window 58 presented by a particular application program (or the operating system itself) on a display or video monitor 60 which may be controlled by a video adapter that is connected to the processor of the computer system. FIG. 4A also illustrates how the graphical pointer itself may change appearance during the dragging operation, such as by adding the plus sign "+" to the arrowhead image. In this example, the dragging operation is completed when the mouse button is released as the modified arrowhead 62 points adjacent to (and to the right of) an "Undo" icon 64 on toolbar 54.

In FIG. 4B, the mouse button has been released, resulting in the generation of a pop-up window 66 listing various operations which might apply to the dragged command. In this case, the operations include "Add" (to copy the "Redo" command from pull-down menu 50 to toolbar 54), and "Move" (to delete the "Redo" command from pull-down 50 after copying it to toolbar 54). FIG. 4B illustrates selection of the "Move" command using the graphical pointer. The final result is shown in FIG. 4C, wherein a modified toolbar 54' has replaced toolbar 54, with modified toolbar 54' having a "Redo" icon 68 adjacent (and to the right of) "Undo" icon 64.

While the figures illustrate the movement of a command from a pull-down menu to a toolbar, those skilled in the art will appreciate that the invention can be applied to other command structures, e.g., copying a toolbar command (icon) to a button on the status bar (such as buttons 70 and 72 of status bar 56). The two command structures can be the same type, e.g., moving a command from a first pull-down menu into a second pull-down menu. Additionally, the invention may be adapted to conveniently allow movement of a command within a single command structure, e.g., moving an item within a pull-down menu. In a further enhancement, the user is allowed to alter the text displayed for text menu items, or select from a number of different icons for a particular toolbar command (for example, "Cut" icons could include a pair of scissors, a knife, or a razor blade).

The present invention also allows deletion of one or more items from a command structure by simply dragging the item (command) from the structure into (over) a trash can icon or recycling bin field provided by the operating system GUI. A conventional interface may be provided to allow any command structure to be individually modified, such as by providing a pop-up list box that displays the entire list of all available commands (including items not currently on a particular command structure, such as items previously deleted), from which any command may be selected for addition to or deletion from the command structure.

A keyboard command or GUI item may be provided to allow the user to reset the command items in the various command structures to default values.

Figure 5:
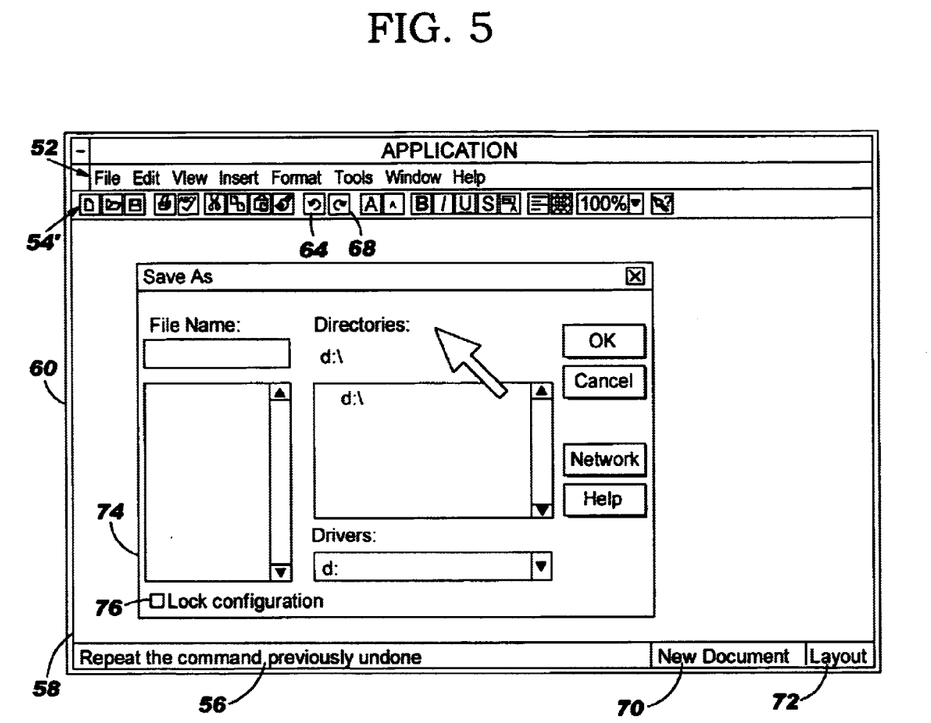
FIG. 5 is an illustration of a further implementation of the present invention wherein the GUI provides a dialog box to allow maintenance of the customized command structure configuration, such as the ability to place an administrative lock on the configuration, save the customized GUI, or load a customized GUI.

In a more advanced implementation, the present invention allows for the maintenance of command structures, such as by a system administrator. A command might be provided under the "Tools" menu bar item, entitled "Save configuration," which brings up a dialog box 74 as shown in FIG. 5. Dialog box 74 allows the administrator (or a privileged user) to enter a name for the current command structure configuration, that is, the collection of information regarding the particular objects and their positions in each pull-down menu, toolbar, and status bar. A checkbox 76 is also provided to lock the configuration for this particular computer system (or this instance of the application that is running on the computer system). If checkbox 76 is marked, then another dialog box (not shown) may be displayed to allow the administrator to enter a password for the system. Thereafter, no changes may be made to any command structure without first entering the password. This feature allows the administrator to create different customized versions of a product tailored to specific user groups (e.g., executive versus data entry clerk versus developer). Locking the interface allows the administrator to provide reliable support and security to each of these groups.

A similar feature can be provided to present a dialog box that allows the administrator to retrieve a pre-defined command structure configuration (using an "Open configuration" command in the pull-down menu under the "Tools" menu bar item).

The configuration can be password-locked without saving it by name. In other words, instead of the aforementioned "Save configuration" command, the "Tools" pull-down menu may include a "Set configuration password" command that simply brings up a dialog box for the password.

The present invention offers many advantages over prior art GUIs, particularly the ability of the user to have complete control over the contents and positions within each of the command areas, via direct manipulation with the mouse. The solutions disclosed here provide the user with intuitive control, complete flexibility, immediate visual feedback, and the ability to lock and save the changes. Moreover, these methods retain current toolbar, status bar and pull-down behavior, and extend their functionality without unduly increasing the visual complexity.

The foregoing techniques can be incorporated into applications or operating systems using standard GUI controls to perform actions, e.g., platform toolkits having user interface libraries in C++, Java, MOTIF, or OS/2 Presentation Manager. The invention could be re-implemented by each application, but would preferably be implemented by the user interface foundation classes for use by application developers.

Although the invention has been described with reference to specific embodiments, this description is not meant to be construed in a limiting sense various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A computer system comprising:
   a display device;
   a pointing device; and
   processor means for generating a graphical user interface on said display device, said graphical user interface including a window having a command structure, and further including a graphical pointer controlled by said pointing device, wherein said processor means dynamically modifies said command structure at runtime in response to direct manipulation of said command structure using said graphical pointer to drag a command item across a portion of the graphical user interface.

2. The computer system of claim 1 wherein:
   said command structure is a toolbar.

3. The computer system of claim 1 wherein:
said command structure is a pull-down menu.

4. The computer system of claim 1 wherein:
said command structure is a status bar.

5. The computer system of claim 1:
wherein said processor means saves a customized version of said graphical user interface created by modification of said command structure.

6. The computer system of claim 5 wherein:
said processor means secures said customized version of said graphical user interface by password-protecting said graphical user interface.

7. The computer system of claim 1 wherein:
said processor means dynamically modifies said command structure in response to direct manipulation of said command structure using said graphical pointer to drag said command item from a first location within said command structure to a second location within said command structure.

8. The computer system of claim 1 wherein:
said processor means dynamically modifies said command structure in response to direct manipulation of said command structure using said graphical pointer to drag said command item from a first location within said command structure to a second location outside of said command structure.

9. The computer system of claim 8 wherein:
said second location is within a system trash icon field of said graphical user interface; and
said command structure is modified by deleting said command item from said command structure.

10. The computer system of claim 8 wherein:
said command structure is a first command structure;
said second location is within a second command structure; and
said command structure is modified by deleting said command item from said command structure.

11. The computer system of claim 6 wherein:
said command structure is a first command structure; and
said processor means dynamically modifies said command structure in response to direct manipulation of said command structure using said graphical pointer to drag said command item from a first location within a second command structure to a second location within said first command structure.

12. The computer system of claim 11 wherein:
said processor means further generates a pop-up window in said graphical user interface allowing a user to select a modification operation to apply to said command item.

13. A method of customizing a graphical user interface depicted on a display device of a computer system, the method comprising the steps of:
moving a graphical pointer of the graphical user interface over a command item at a first location in a command structure;
dragging the command item across a portion of the graphical user interface using the graphical pointer; and
dropping the command item at a second location in the graphical user interface; and
modifying the command structure at runtime in response to said dropping step.

14. The method of claim 13 wherein:
the second location is within the command structure; and
said modifying step moves the position of the command item inside the command structure.

15. The method of claim 13 wherein:
the second location is outside of the command structure; and
said modifying step deletes the command item from the command structure.

16. The method of claim 15 wherein:
the command structure is a first command structure, the second location is within a second command structure, and further comprising the step of adding the command item to the second command structure.

17. The method of claim 13 further comprising the step of saving a customized version of the graphical user interface created by modification of the command structure.

18. The method of claim 17 further comprising the step of securing the customized version of the graphical user interface by password-protecting the graphical user interface.

19. A method of customizing a graphical user interface depicted on a display device of a computer system, the method comprising the steps of:
moving a graphical pointer of the graphical user interface over a command item at a first location in a first command structure;
dragging the command item across a portion of the graphical user interface using the graphical pointer; and
dropping the command item at a second location in a second command structure; and
adding the command item to the second command structure in response to said dropping step.

20. The method of claim 19 further comprising the step of generating a pop-up win in the graphical user interface allowing a user to select a modification operation to apply to the command item.

21. The method of claim 19 further comprising the step of saving a customized version of the graphical user interface created by modification of the command structures.

22. The method of claim 21 further comprising the step of securing the customized version of the graphical user interface by password-protecting the graphical user interface.

23. The method of claim 19 further comprising the step of resetting the graphical user interface by modifying at least one of the first and second command structure to provide default command items.

* * * * *